US012264578B2

(12) United States Patent
Clegg et al.

(10) Patent No.: US 12,264,578 B2
(45) Date of Patent: Apr. 1, 2025

(54) FLUID MONITORING IN OIL AND GAS WELLS USING ULTRA-DEEP AZIMUTHAL ELECTROMAGNETIC LOGGING WHILE DRILLING TOOLS

(71) Applicant: Halliburton Energy Services, Inc., Houston, TX (US)

(72) Inventors: Nigel Mark Clegg, Norwick (GB); Ahmet Celalettin Aki, Dubai (AE); Alban Gerard Duriez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 129 days.

(21) Appl. No.: 17/901,302

(22) Filed: Sep. 1, 2022

(65) Prior Publication Data
US 2023/0313672 A1    Oct. 5, 2023

Related U.S. Application Data

(60) Provisional application No. 63/324,899, filed on Mar. 29, 2022.

(51) Int. Cl.
*E21B 47/10*   (2012.01)
*E21B 47/002*  (2012.01)
(Continued)

(52) U.S. Cl.
CPC ............... *E21B 47/10* (2013.01); *G01V 3/30* (2013.01); *G01V 3/38* (2013.01); *E21B 47/002* (2020.05)

(58) Field of Classification Search
CPC .... E21B 47/002; E21B 47/0025; E21B 47/10; G01V 3/18; G01V 3/38
See application file for complete search history.

(56) References Cited

U.S. PATENT DOCUMENTS 8,347,658 B2 * 1/2013 Thompson ............. G16Z 99/00
  702/14
8,498,845 B2 * 7/2013 Jing ......................... G01V 3/38
  703/2
(Continued)

FOREIGN PATENT DOCUMENTS

CA    2904674 A1 *  6/2013  ............... G01V 3/12
CN  104350233 A  *  2/2015  ............. E21B 43/00
(Continued)

OTHER PUBLICATIONS

SPWLA 60th Annual Logging Symposium, The Final Piece of the Puzzle: 3-D Inversion of Ultra-Deep Azimuthal Resistivity LWD Data, Nigel Clegg, et al., Jun. 15-19, 2019.
(Continued)

*Primary Examiner* — Jennifer H Gay
(74) *Attorney, Agent, or Firm* — Benjamin Ford; C. Tumey Law Group PLLC

(57) ABSTRACT

A method for monitoring one or more formation fluids in a subterranean formation. The method may include disposing a logging while drilling (LWD) system into a wellbore, measuring the one or more formation fluids in the subterranean formation with an electromagnetic (EM) measurement system disposed on the LWD system to form an EM data set, and inverting the EM data set using an information handling system to form a first image of the one or more formation fluids in the subterranean formation. The method may further include disposing the LWD system into the wellbore a second time, taking a second measurement the one or more formation fluids in the subterranean formation with an EM measurement system disposed on the LWD system to form a second EM data set, inverting the second EM data set using the information handling system to form a second image, and comparing the first image to the second.

18 Claims, 5 Drawing Sheets

(51) Int. Cl.
*G01V 3/30* (2006.01)
*G01V 3/38* (2006.01)

(56) References Cited

U.S. PATENT DOCUMENTS

| | | | | |
|---|---|---|---|---|
| 8,938,363 | B2* | 1/2015 | Beasley | E21B 43/26 |
| | | | | 166/308.1 |
| 9,091,781 | B2* | 7/2015 | Altman | G01V 20/00 |
| 10,242,126 | B2* | 3/2019 | Zhdanov | G01V 1/30 |
| 10,385,677 | B2* | 8/2019 | Gzara | E21B 43/00 |
| 10,393,913 | B2* | 8/2019 | Kherroubi | G01V 3/38 |
| 10,436,011 | B2* | 10/2019 | Wu | G01V 3/34 |
| 10,451,765 | B2* | 10/2019 | Wessling | G01V 3/26 |
| 10,928,540 | B2* | 2/2021 | Wilson | E21B 47/111 |
| 11,163,080 | B2* | 11/2021 | Cobos | G06F 30/20 |
| 11,300,702 | B2* | 4/2022 | Djefel | E21B 47/0025 |
| 2006/0087449 | A1* | 4/2006 | Radzinski | E21B 47/04 |
| | | | | 340/854.3 |
| 2011/0166842 | A1* | 7/2011 | Banning-Geertsma | |
| | | | | G01V 11/00 |
| | | | | 703/6 |
| 2011/0184711 | A1* | 7/2011 | Altman | G01V 20/00 |
| | | | | 702/7 |
| 2011/0264421 | A1* | 10/2011 | Jing | G01V 3/38 |
| | | | | 703/2 |
| 2011/0272147 | A1* | 11/2011 | Beasley | E21B 43/26 |
| | | | | 166/250.1 |
| 2012/0253680 | A1* | 10/2012 | Thompson | G16Z 99/00 |
| | | | | 73/152.16 |
| 2013/0179130 | A1* | 7/2013 | Zhandov | G06F 30/00 |
| | | | | 703/2 |
| 2013/0338926 | A1* | 12/2013 | Gzara | E21B 43/00 |
| | | | | 702/8 |
| 2014/0266214 | A1* | 9/2014 | Alumbaugh | G01V 3/26 |
| | | | | 324/355 |
| 2015/0260874 | A1* | 9/2015 | Chen | G01V 3/24 |
| | | | | 324/338 |
| 2015/0369949 | A1* | 12/2015 | Cuevas | G01V 3/26 |
| | | | | 324/338 |
| 2016/0061987 | A1* | 3/2016 | Kherroubi | G01V 3/18 |
| | | | | 702/7 |
| 2016/0102500 | A1* | 4/2016 | Donderici | G01V 3/20 |
| | | | | 175/45 |
| 2017/0167241 | A1* | 6/2017 | Wu | G01V 3/34 |
| 2017/0322339 | A1* | 11/2017 | Wessling | E21B 7/04 |
| 2018/0073353 | A1* | 3/2018 | Malik | E21B 47/0025 |
| 2018/0136356 | A1* | 5/2018 | Wilson | E21B 47/01 |
| 2019/0113650 | A1 | 4/2019 | Guner et al. | |
| 2019/0353813 | A1* | 11/2019 | Cobos | G01V 11/00 |
| 2020/0116018 | A1 | 4/2020 | Coates et al. | |
| 2020/0265615 | A1 | 8/2020 | Di Santo et al. | |
| 2020/0271820 | A1 | 8/2020 | Abdulkarim et al. | |
| 2021/0189868 | A1* | 6/2021 | Gooneratne | E21B 34/066 |
| 2021/0208302 | A1 | 7/2021 | Ma et al. | |
| 2021/0239873 | A1* | 8/2021 | Djefel | G01V 3/38 |
| 2021/0381365 | A1 | 12/2021 | Clegg et al. | |
| 2022/0090486 | A1 | 3/2022 | Clegg et al. | |
| 2022/0381937 | A1* | 12/2022 | Luling | E21B 47/002 |
| 2023/0214548 | A1* | 7/2023 | Pan | G01V 3/38 |
| | | | | 703/2 |
| 2023/0313672 | A1* | 10/2023 | Clegg | E21B 47/0228 |
| | | | | 175/45 |
| 2023/0374897 | A1* | 11/2023 | Lawrence | E21B 21/01 |

FOREIGN PATENT DOCUMENTS

| | | | | |
|---|---|---|---|---|
| CN | 111983703 A | * | 11/2020 | G01V 3/265 |
| CN | 108345719 B | * | 9/2021 | E21B 49/00 |
| EA | 006178 B1 | * | 6/2002 | G01V 3/32 |
| JP | H0862159 A | * | 8/1994 | G01N 23/04 |
| WO | WO-03040743 A1 | * | 5/2003 | G01V 3/32 |

OTHER PUBLICATIONS

International Search Report and Written Opinion for International Application No. PCT/US2022/044416 dated Jan. 18, 2023.

* cited by examiner

DURING DRILLING
PLAIN VIEW AT WELL BORE LEVEL

RUN AFTER A PERIOD OF PRODUCTION
PLAIN VIEW AT WELL BORE LEVEL

RUN AFTER A FURTHER PERIOD OF PRODUCTION
PLAIN VIEW AT WELL BORE LEVEL

SIDE VIEW

SIDE VIEW

SIDE VIEW

FLUID MONITORING IN OIL AND GAS WELLS USING ULTRA-DEEP AZIMUTHAL ELECTROMAGNETIC LOGGING WHILE DRILLING TOOLS

BACKGROUND

Wellbores drilled into subterranean formations may enable recovery of desirable formation fluids (e.g., hydrocarbons) using a number of different techniques. A logging tool may be employed in subterranean operations to determine wellbore and/or formation properties. Formation evaluation further from a wellbore is a critical step in reservoir characterization and monitoring. Logging tools typically measure the "near-field", or in the proximity of the wellbore. Logging tools are evolving to measure the "far-field", or large distances from the wellbore.

Generally, electromagnetic measurements may be performed using logging while drilling (LWD) tools during drilling of horizontal and near horizontal oil and gas wells for mapping formations and formation fluids. This allows for well placement, but also allows for identification and mapping of any formation fluids by their resistivities. These formation fluids may have an impact on production from a well, particularly when water is identified. Well placement operations are conducted to avoid these water zones if the well is intended for hydrocarbon production. Even if these water flooded zones are avoided, when production of hydrocarbons from the well begins, the water may be pulled towards or into the well. Where water is injected in other wells in the field this may form an additional drive to move formation fluids towards the well. The water may be drawn into the well, impacting hydrocarbon production. Separating water from hydrocarbons is expensive and as a horizontal well may be several kilometers in length, it may not be possible to identify where the water in entering the well. If it is possible to identify where water is entering the well, or which of the nearby injector wells is responsible for forcing water into the well, then remedial action may be taken.

BRIEF DESCRIPTION OF THE DRAWINGS

These drawings illustrate certain aspects of some examples of the present disclosure and should not be used to limit or define the disclosure.

DETAILED DESCRIPTION

The present application is directed to methods and systems for monitoring formation fluid migration through a subterranean formation. Generally, reservoir simulations are routinely conducted to try to model formation fluid movement, there are many unknown or estimated elements, which may lead to errors in the results. Monitoring formation fluids after production starts would allow these simulations to be calibrated. Some monitoring of reservoir formation fluids is conducted by wireline operations but may be limited by wellbore inclination. By deploying electromagnetic tool on a LWD platform, formation fluid monitoring may be utilized in horizontal or near horizontal wells to depths deeper than standard wireline tools.

Figure 1:
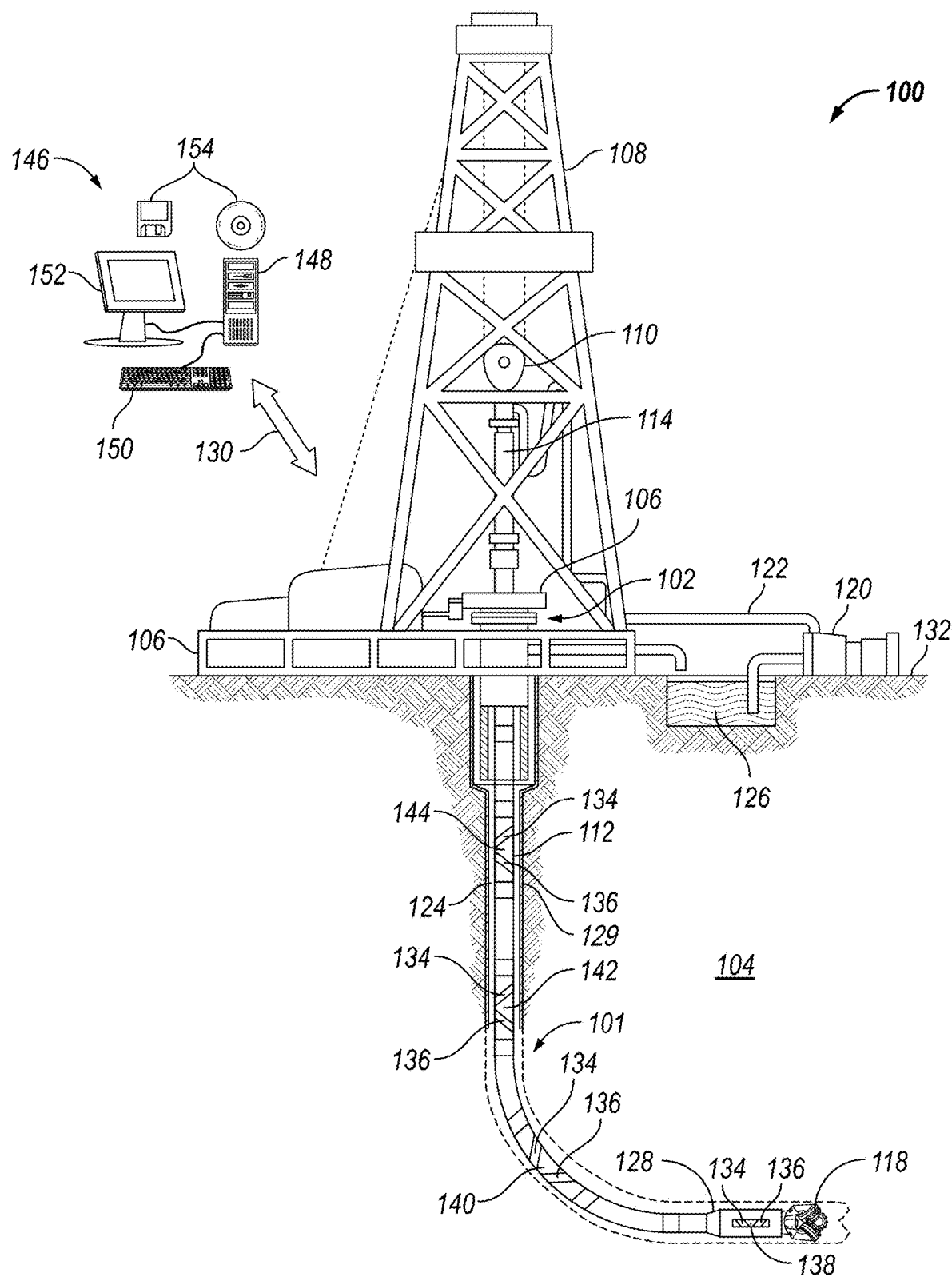
FIG. 1 illustrates an example of an electromagnetic (EM) well measurement system.

FIG. 1 illustrates a drilling system 100. As illustrated, drilling system 100 may comprise a drilling platform 106 may support a derrick 108 having a traveling block 110 for raising and lowering drill string 112. Drill string 112 may comprise, but is not limited to, drill pipe and coiled tubing, as generally known to those skilled in the art. A kelly 114 may support drill string 112 as it may be lowered through a rotary table 116. A drill bit 118 may be attached to the distal end of drill string 112 and may be driven either by a downhole motor and/or via rotation of drill string 112 from surface 132. Without limitation, drill bit 118 may comprise, roller cone bits, PDC bits, natural diamond bits, any hole openers, reamers, coring bits, and the like. As drill bit 118 rotates, it may create and extend wellbore 101 that penetrates various subterranean formations 104.

Generally, wellbore 101 may comprise horizontal, vertical, slanted, curved, and other types of wellbore geometries and orientations. Wellbore 101 may be cased or uncased. In examples, wellbore 101 may comprise a metallic material 129. By way of example, the metallic member may be a casing, liner, tubing, or other elongated steel tubular disposed in wellbore 101.

As illustrated, wellbore 101 may extend through subterranean formation 104. As illustrated in FIG. 1, wellbore 101 may extending generally vertically into the subterranean formation 104, however wellbore 101 may extend at an angle through subterranean formation 104, such as horizontal and slanted wellbores. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

With continued reference to FIG. 1, a pump 120 may circulate drilling fluid through a feed pipe 122 to kelly 114, downhole through interior of drill string 112, through orifices in drill bit 118, back to surface 132 via annulus 124 surrounding drill string 112, and into a retention pit 126. Drill string 112 may begin at wellhead 102 and may traverse wellbore 101. Drill bit 118 may be attached to a distal end of drill string 112 and may be driven, for example, either by a downhole motor and/or via rotation of drill string 112 from surface 132. Drill bit 118 may be a part of bottom hole assembly 128 at distal end of drill string 112.

Drilling system 100 may comprise one or more electromagnetic tools, which may be used in a number of downhole tools operations, such as measuring-while-drilling (MWD), logging-while-drilling (LWD), wireline logging, and permanent monitoring operations. In examples, without limitation, tubulars may be disposed within the drill collar on a bottom hole assembly, a wireline tool mandrel, and/or permanently installed production casing. For brevity, the metallic tubular may be referred to as a downhole tool below. The electromagnetic antenna in the electromagnetic tool may be a magnetometer and/or an induction coil, which may reside on the downhole tool and/or outside. In examples, an electromagnetic source may be an electromagnetic antenna, which may be energized to produce an electromagnetic field. Where used, either the electromagnetic antenna and/or electromagnetic source may reside on the bottom hole assembly and/or outside, even on the surface.

Electromagnetic antennae may record voltages from electromagnetic fields induced by the electromagnetic source. Depending on details of the electromagnetic antenna's design and the size of the computation domain (i.e., mandrel and wellbore lengths) comprised in an inversion computation, it may take hours to a matter of days to fully compute recorded data from electromagnetic antenna(s). Without limitation, operations that may compute electric and/or magnetic fields may determine the distance and inclination of target well in ranging applications, bed resistivity and distances to bed boundaries in resistivity application, as well as distance to oil-water interface and resistivity change in waterflood monitoring application. Computation of the inversion may comprise a list of unknown parameters and the accuracy of these parameters may depend on the accuracy of a forward model. Forward models may comprise full-wave methods which may capture a mandrel (i.e., the supporting structured of the downhole tool) and the wellbore effect accurately.

Electromagnetic measurement system 133 may comprise a first downhole tool 138, a second downhole tool 140, a third downhole tool 142, and/or a fourth downhole tool 144 disposed on a conveyance, which may be lowered into wellbore 101. In examples, each downhole tool may be separated by about 1 foot (0.3 meter) to about 100 feet (30 meters), about twenty feet (6.096 meters) to about 200 feet (61 meters), or about 50 feet (15 meters) to about 100 (30 meters). It should be noted that each "downhole tool" may be referred to as a sub-assembly. During operations, electromagnetic measurement system 133 may be able to perform three-dimensional (3D) inversion out to 100 feet (30 meters) or greater. This may allow for identifying the movement of formation fluids in a subterranean formation 104 in an 3D space. In examples, formation fluid may be water, hydrocarbons, and/or any combination thereof. It should be noted that electromagnetic measurement system 133 may comprise any number of electromagnetic tools, which may be used in a number of downhole tools operations, such as measuring-while-drilling (MWD), logging-while-drilling (LWD), wireline logging, and monitoring operations. In examples, without limitation, tubulars may be disposed within the drill collar on a bottom hole assembly, a wireline tool mandrel, and/or permanently installed production casing. For brevity, the metallic tubular may be referred to as a downhole tool below. The electromagnetic antenna in the electromagnetic tool may be a magnetometer and/or an induction coil, which may reside on the downhole tool and/or outside. In examples, an electromagnetic source may be an electromagnetic antenna, which may be energized to produce an electromagnetic field. Where used, either the electromagnetic antenna and/or electromagnetic source may reside on the bottom hole assembly and/or outside, even on the surface.

Electromagnetic antennae may record voltages from electromagnetic fields induced by the electromagnetic source. Depending on details of the electromagnetic antenna's design and the size of the computation domain (i.e., mandrel and wellbore lengths) comprised in an inversion computation, it may take hours to a matter of days to fully compute recorded data from electromagnetic antenna(s). Without limitation, operations that may compute electric and/or magnetic fields may determine the distance and inclination of target well in ranging applications, bed resistivity and distances to bed boundaries in resistivity application, as well as distance to oil-water interface and resistivity change in waterflood monitoring application. Computation of the inversion may comprise a list of unknown parameters and the accuracy of these parameters may depend on the accuracy of a forward model. Forward models may comprise full-wave methods which may capture a mandrel (i.e., the supporting structured of the downhole tool) and the wellbore effect accurately.

With continued reference to FIG. 1, bottom hole assembly 128 may further comprise first downhole tool 138. First downhole tool 138 may be disposed on the outside and/or within bottom hole assembly 128. It should be noted that second downhole tool 140, third downhole tool 142, and/or fourth downhole tool 144 may be disposed on drill string 112. Second downhole tool 140, third downhole tool 142, and/or fourth downhole tool 144 may be disposed on the outside and/or within drill string 112 and/or bottom hole assembly 128. First downhole tool 138, second downhole tool 140, third downhole tool 142, and/or fourth downhole tool 144 may comprise at least one electromagnetic transmitter 134 and/or at least one electromagnetic receiver 136. It should be noted that first downhole tool 138, second downhole tool 140, third downhole tool 142, and/or fourth downhole tool 144 may comprise at least one electromagnetic transmitter 134 and/or at least one electromagnetic receiver 136. Electromagnetic transmitters 134 and/or electromagnetic receivers 136 may operate and/or function as electromagnetic antenna, described above. It should be noted that both electromagnetic transmitters 134 and/or electromagnetic receiver 136 may be referred to as antenna. As will be appreciated by those of ordinary skill in the art, first downhole tool 138, second downhole tool 140, third downhole tool 142, and/or fourth downhole tool 144 may be a measurement-while drilling (MWD) or logging-while-drilling (LWD) system.

Without limitation, first downhole tool 138, second downhole tool 140, third downhole tool 142, and/or fourth downhole tool 144, electromagnetic transmitters 134, and/or electromagnetic receiver 136 may be connected to and/or controlled by information handling system 146, which may be disposed on surface 132.

Systems and methods of the present disclosure may be implemented, at least in part, with information handling system 146. Information handling system 146 may comprise any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 146 may be a personal computer, two or more computers working in a network, a network storage device, or any other suitable device and may vary in size, shape, performance, functionality, and price. Information handling system 146 may comprise random access memory (RAM), one or more processing resources such as a central processing unit (CPU) 148 or hardware or software control logic, ROM, and/or other types of nonvolatile memory. Additional components of the information handling system 146 may comprise one or more disk drives, one or more network ports for communication with external devices as well as an input device 150 (e.g., keyboard, mouse, etc.) and output devices, such as a video display 152. Information handling system 146 may also comprise one or more buses operable to transmit communications between the various hardware components.

Alternatively, systems and methods of the present disclosure may be implemented, at least in part, with non-transitory computer-readable media 154. Non-transitory computer-readable media 154 may comprise any instrumentality or aggregation of instrumentalities that may retain data and/or instructions for a period of time. Non-transitory computer-readable media 154 may comprise, for example, storage media such as a direct access storage device (e.g., a hard disk drive or floppy disk drive), a sequential access storage device (e.g., a tape disk drive), compact disk, CD-ROM, DVD, RAM, ROM, and electrically erasable programmable read-only memory (EEPROM), and/or flash memory. In examples, communications media may be used to move information from one non-transitory computer-readable media 154 to another. Communications media may comprise wires, optical fibers, microwaves, radio waves, and other electromagnetic and/or optical carriers; and/or any combination of the foregoing.

Without limitation, information handling system 146 may be disposed downhole in first downhole tool 138, second downhole tool 140, third downhole tool 142, and/or fourth downhole tool 144. Processing of information recorded may occur downhole and/or on surface 132. Processing occurring downhole may be transmitted to surface 132 to be recorded, observed, and/or further analyzed. Additionally, information recorded on information handling system 146 that may be disposed downhole may be stored until first downhole tool 138, second downhole tool 140, third downhole tool 142, and/or fourth downhole tool 144 may be brought to surface 132. In examples, information handling system 146 may communicate with first downhole tool 138, second downhole tool 140, third downhole tool 142, and/or fourth downhole tool 144 through a communication line (not illustrated) disposed in (or on) drill string 112. In examples, wireless communication may be used to transmit information back and forth between information handling system 146 and first downhole tool 138, second downhole tool 140, third downhole tool 142, and/or fourth downhole tool 144. Information handling system 146 may transmit information to first downhole tool 138, second downhole tool 140, third downhole tool 142, and/or fourth downhole tool 144 and may receive as well as process information recorded by first downhole tool 138, second downhole tool 140, third downhole tool 142, and/or fourth downhole tool 144. In examples, a downhole information handling system (not illustrated) may comprise, without limitation, a microprocessor or other suitable circuitry, for estimating, receiving and processing signals from first downhole tool 138, second downhole tool 140, third downhole tool 142, and/or fourth downhole tool 144. Downhole information handling system (not illustrated) may further comprise additional components, such as memory, input/output devices, interfaces, and the like. In examples, while not illustrated, first downhole tool 138, second downhole tool 140, third downhole tool 142, and/or fourth downhole tool 144 may comprise one or more additional components, such as analog-to-digital converter, filter and amplifier, among others, that may be used to process the measurements of first downhole tool 138, second downhole tool 140, third downhole tool 142, and/or fourth downhole tool 144 before they may be transmitted to surface 132. Alternatively, raw measurements from first downhole tool 138, second downhole tool 140, third downhole tool 142, and/or fourth downhole tool 144 may be transmitted to surface 132.

Any suitable technique may be used for transmitting signals from first downhole tool 138, second downhole tool 140, third downhole tool 142, and/or fourth downhole tool 144 to surface 132, including, but not limited to, wired pipe telemetry, mud-pulse telemetry, acoustic telemetry, and electromagnetic telemetry. While not illustrated, first downhole tool 138, second downhole tool 140, third downhole tool 142, and/or fourth downhole tool 144 may comprise a telemetry subassembly that may transmit telemetry data to surface 132. Without limitation, an electromagnetic source in the telemetry subassembly may be operable to generate pressure pulses in the drilling formation fluid that propagate along the formation fluid stream to surface 132. At surface 132, pressure transducers (not shown) may convert the pressure signal into electrical signals for a digitizer (not illustrated). The digitizer may supply a digital form of the telemetry signals to information handling system 146 via a communication link 130, which may be a wired or wireless link. The telemetry data may be analyzed and processed by information handling system 146.

As illustrated, communication link 130 (which may be wired or wireless, for example) may be provided that may transmit data from first downhole tool 138, second downhole tool 140, third downhole tool 142, and/or fourth downhole tool 144 to an information handling system 146 at surface 132. Information handling system 146 may comprise a central processing unit 148, a video display 152, an input device 150 (e.g., keyboard, mouse, etc.), and/or non-transitory computer-readable media 154 (e.g., optical disks, magnetic disks) that may store code representative of the methods described herein. In addition to, or in place of processing at surface 132, processing may occur downhole.

First downhole tool 138, second downhole tool 140, third downhole tool 142, and/or fourth downhole tool 144 may comprise an electromagnetic transmitter 134 and/or an electromagnetic receiver 136. In examples, first downhole tool 138, second downhole tool 140, third downhole tool 142, and/or fourth downhole tool 144 may operate with additional equipment (not illustrated) on surface 132 and/or disposed in a separate electromagnetic well measurement system (not illustrated) to record measurements and/or values from subterranean formation 104. During operations, electromagnetic transmitter 134 may broadcast an electromagnetic field from first downhole tool 138, second downhole tool 140, third downhole tool 142, and/or fourth downhole tool 144. Electromagnetic transmitter 134 may be connected to information handling system 146, which may further control the function and/or operation of electromagnetic transmitter 134. Additionally, electromagnetic receiver 136 may sense, measure, and/or record electromagnetic fields broadcasted from electromagnetic transmitter 134. Electromagnetic receiver 136 may transfer recorded information to information handling system 146. Information handling system 146 may control the operation of electromagnetic receiver 136. For example, the broadcasted electromagnetic field from electromagnetic transmitter 134 may be altered (i.e., in phase and attenuation, and/or the like) by subterranean formation 104. The altered electromagnetic field may be recorded by electromagnetic receiver 136 and may be transferred to information handling system 146 for further processing. In examples, there may be any suitable number of electromagnetic transmitters 134 and/or electromagnetic receivers 136, which may be controlled by information handling system 146. Information and/or measurements may be processed further by information handling system 146 to determine properties of wellbore 101, formation fluids, and/or subterranean formation 104.

In examples, there may be any suitable number of electromagnetic transmitters 134 and/or electromagnetic receivers 136, which may be controlled by information handling system 146. Information and/or measurements may be processed further by information handling system 146 to determine properties of wellbore 101, formation fluids, and/or subterranean formation 104.

Many subsurface geological differences resulting from how the reservoir was deposited and how it has changed since burial affect the position of formations around wellbore 101. Formation fluids are more mobile in certain lithologies such as a clean sand or may exploit pathways along highly permeable zones or along structural boundaries such as faults and fractures. Mapping the pathways that these formation fluids are drawn along to wellbore 101 may provide better understanding of the reservoir and the migration pathways. Reservoir simulations are commonly run to try to define the expected formation fluid flow through a reservoir. These simulations rely on defining bulk formation properties which may be incorrect, as subterranean formations 104 may show considerable lateral changes, in addition they may not comprise the effect that preferred formation fluid pathways such as faults or fractures have on the formation fluid movement. Data from multiple runs of electromagnetic (EM) measurement system 133 may be used to calibrate these simulations and allow them to be refined providing a better understanding of the reservoir.

Figure 2:
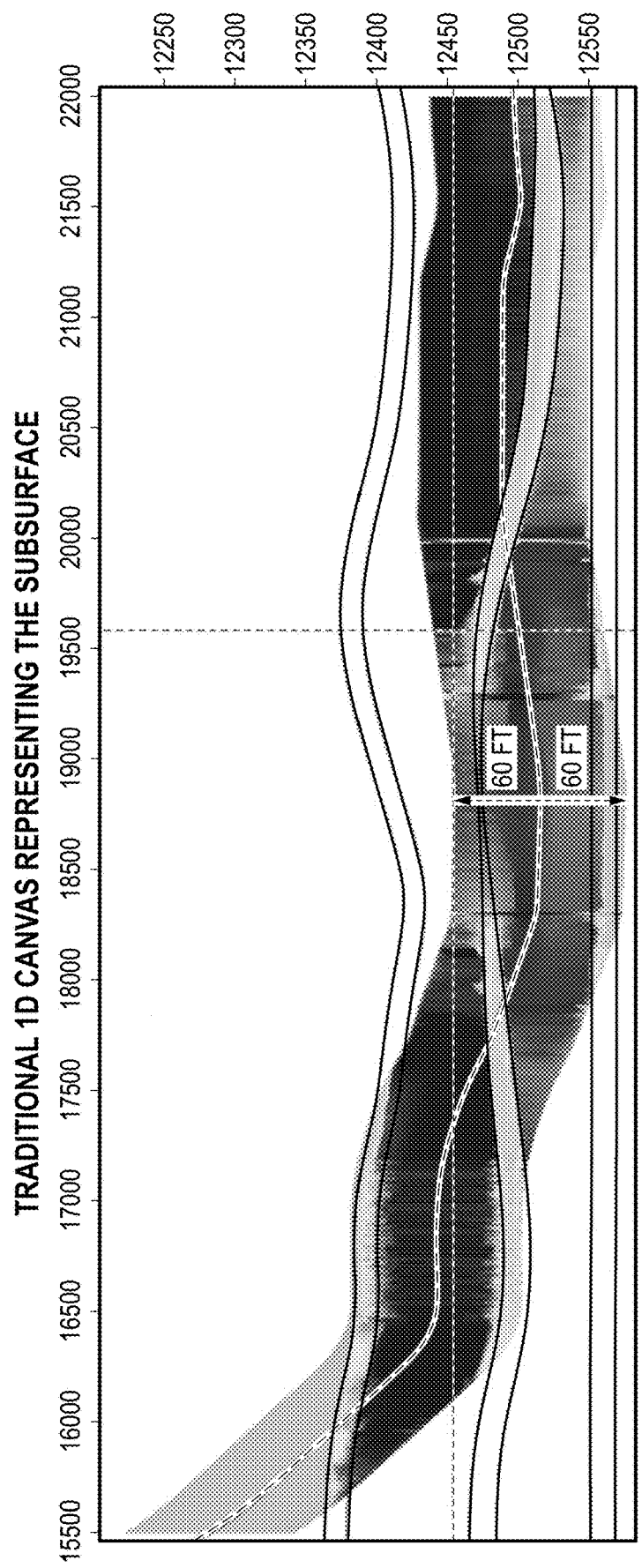
FIG. 2 is a graph of EM data from a measurement operation.
Figure 3:
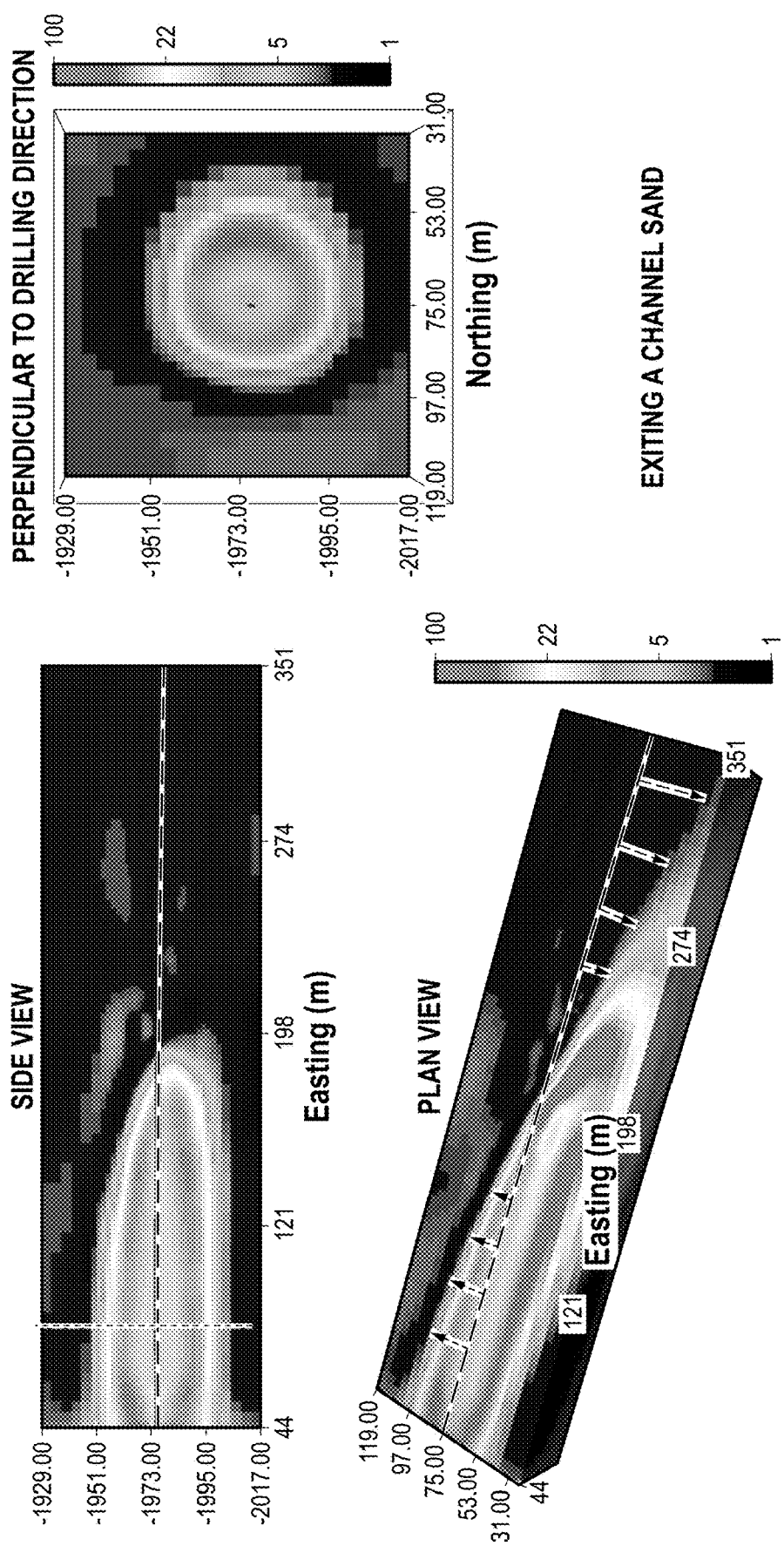
FIG. 3 illustrates a three-dimensional (3D) inversion of the EM data from FIG. 2.

EM measurement system 133 may perform measurement operations during the drilling of horizontal oil and gas wells to map formation/formation fluid resistivities and anisotropy values as electromagnetic (EM) data, in any azimuthal direction. As illustrated in FIG. 2, EM data from measurement operations may be presented in the form of two dimensional (2D) plots along wellbore 101 (e.g., referring to FIG. 1) generated from one dimensional (1D) and 2D inversions. These plots may allow formation resistivity and formation fluid resistivities above and below wellbore 101 to be mapped. As illustrated in FIG. 3, a three-dimensional (3D) inversion of the EM data allows boundaries of subterranean formation 104 and formation fluid boundaries to be mapped in all directions around EM measurement system 133.

A single measurement operation may provide a static image of formation fluids disposed in and/or around wellbore 101, while multiple measurement operations may allow a dynamic map of water movement in and/or around wellbore 101 to be established. A three-dimensional (3D) inversion of the EM data may further illustrate changes in the position of formation fluids in all directions of wellbore 101 to be mapped. Mapping and understanding how the position of the formation fluids changes over time allows for the production and injection strategy for a field to be optimized, increasing the longevity of a wellbore 101 and increasing production. If linked to injection pressure data from any surrounding injector wells the impact of injection from individual or multiple wells may be identified, allowing optimization of an injection strategy.

Generally, formation fluid monitoring operations may comprise performing multiple measurement operations with EM measurement system 133 in wellbore 101. After each measurement operation, measured formation fluid positions may be updated and mapped, which may indicate if formation fluids have moved during production and identify any trends in movement of the formation fluids. EM measurement system 133 may allow for a depth of investigation of up to 100 to 200 ft (depending on the tool configuration and background resistivity), which may allow formation fluids to be mapped a significant distance from wellbore 101. Additionally, a 3D inversion of measurement data may allow for formation fluids to be mapped in all directions around EM measurement system 133. This may assist in identifying formation fluid position movement laterally as well as vertically. Generally, fields/reservoirs may comprise multiple injector wells to push hydrocarbons towards production wells. Injector wells may have a lateral standoff from production wells, thus any formation fluids moving from the injector well towards the production well may move laterally as well as vertically. This may provide data beyond what is possible with 4D seismic tracking of formation fluids due to the difference in scale.

Figure 4A:
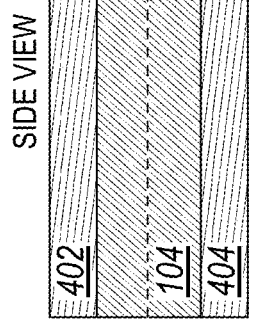
FIGS. 4A & 4B illustrate EM measurements taken by the EM measurement system from a measurement operation during a first drilling operations.
Figure 4B:
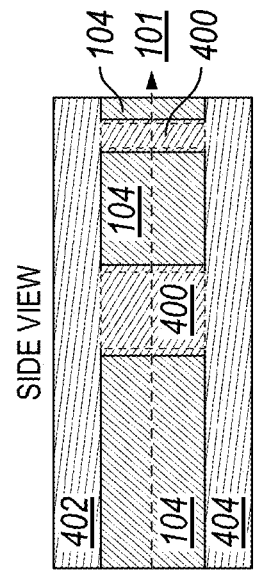

FIGS. 4A and 4B illustrate EM measurements taken by EM measurement system 133 (e.g., referring to FIG. 1) from a measurement operation during a first drilling operation. As illustrated, wellbore 101 may be disposed in a horizontal run through subterranean formation 104. FIG. 4A is a top-down view of an image that details a horizontal plane of wellbore 101. As seen water 400 may be disposed horizontally from wellbore 101. FIG. 4B illustrates a side view of drilling operations, which shows wellbore 101 disposed horizontally through subterranean formation 104. In this side view, shale cap rock 402 is seen above wellbore 101 and shale 404 is seen below wellbore 101.

Figure 5A:
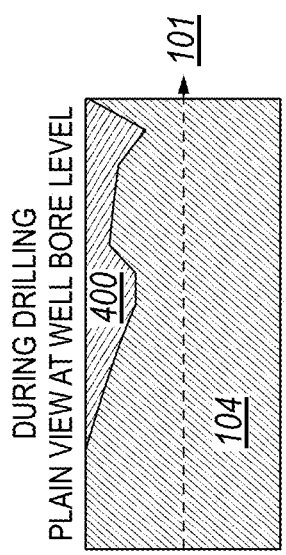
FIGS. 5A & 5B illustrate EM measurements from a second measurement operation after production operations.
Figure 5B:
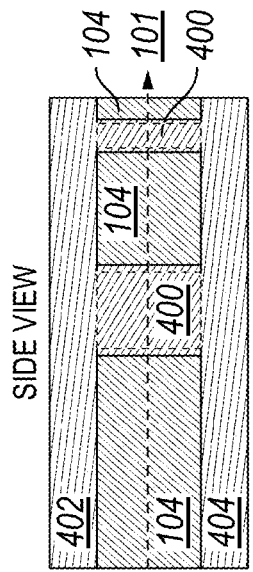

FIGS. 5A and 5B illustrate EM measurements from a measurement operation after production operations. As illustrated, wellbore 101 may be disposed in a horizontal run through subterranean formation 104. FIG. 5A is a top-down view of an image that details a horizontal plane of wellbore 101. As seen in FIG. 5A, water 400 has moved horizontally toward and may be in contact with wellbore 101. Comparing the measured image in FIG. 5A to FIG. 4A, there is movement of water 400 and formation fluids in subterranean formation 104. FIG. 5B illustrate a side view of the measurement operation after production operations, which shows wellbore 101 disposed horizontally through subterranean formation 104. In this side view, water 400 is not measured and seen vertically between shale cap rock 402 and shale 404, which further identifies water 400 movement and formation fluid movement in subterranean formation 104.

Figure 6A:
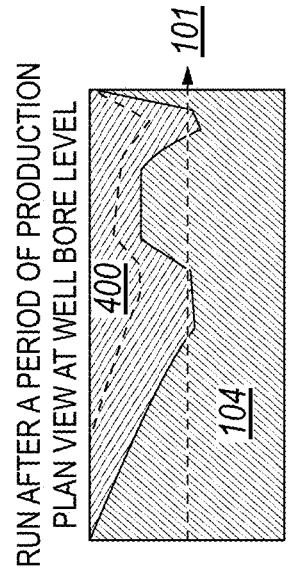
FIGS. 6A & 6B illustrate EM measurements from a third measurement operation after additional production operations have been performed after the images of FIGS. 5A and 6B have been taken.
Figure 6B:
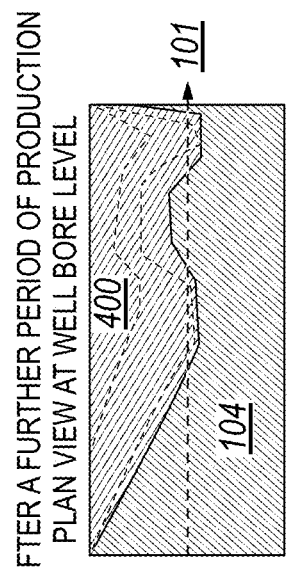

FIGS. 6A and 6B illustrate EM measurements from a measurement operation after additional production operations have been performed after the images of FIGS. 5A and 6B have been taken. As illustrated, wellbore 101 may be disposed in a horizontal run through subterranean formation 104. FIG. 6A is a top-down view of an image that details a horizontal plane of wellbore 101. As seen in FIG. 6A, water 400 has moved horizontally toward and may be in contact with wellbore 101. Comparing the measured image in FIG. 6A to FIG. 5A, there is movement of water 400 and formation fluids in subterranean formation 104. FIG. 6B illustrate a side view of the measurement operation after production operations, which shows wellbore 101 disposed horizontally through subterranean formation 104. In this side view, water 400 is not measured and seen vertically between shale cap rock 402 and shale 404, which further identifies additional water 400 movement and formation fluid movement in subterranean formation 104.

Generally, EM measurement system 133 (e.g., referring to FIG. 1) may only perform a single measurement operation during drilling operations. However, as disclosed, an EM measurement system 133 is utilized multiple times on a drilling system 100 (e.g., referring to FIG. 1) to monitor formation fluid movement, as discussed above. Currently, other logging tools are run after wellbore 101 has been completed but these other logging tools do not have the depth of investigation and 3D formation fluid resistivity mapping capabilities of EM measurement system 133. In addition, EM measurement system 133 may perform measurement operation in horizontal or near horizontal wells allowing mapping of the formation fluids for considerable distances through the reservoir, which may be difficult for a wireline tool. Wireline tools may be used to monitor the formation resistivity, but standard wireline tools do not have the depth of investigation of EM measurement system 133 or 3D inversion capability. Additionally, wireline tools may generally be utilized in wellbores 101 with lower inclinations than are commonly encountered in horizontal production wells.

In mature fields which have many wells, a well 101 may be drilled for monitoring purposes with EM well measurement system 100 (e.g., referring to FIG. 1). Construction of wellbore 101 may be in such a manner as to reduce, if not prevent, the use of metal in wellbore 101, and which may utilize a set hole diameter in the target section large enough to fit EM measurement system 133. EM measurement system 133 may then be run in this monitoring well at defined time intervals to map any formation fluid movement.

Figure 7:
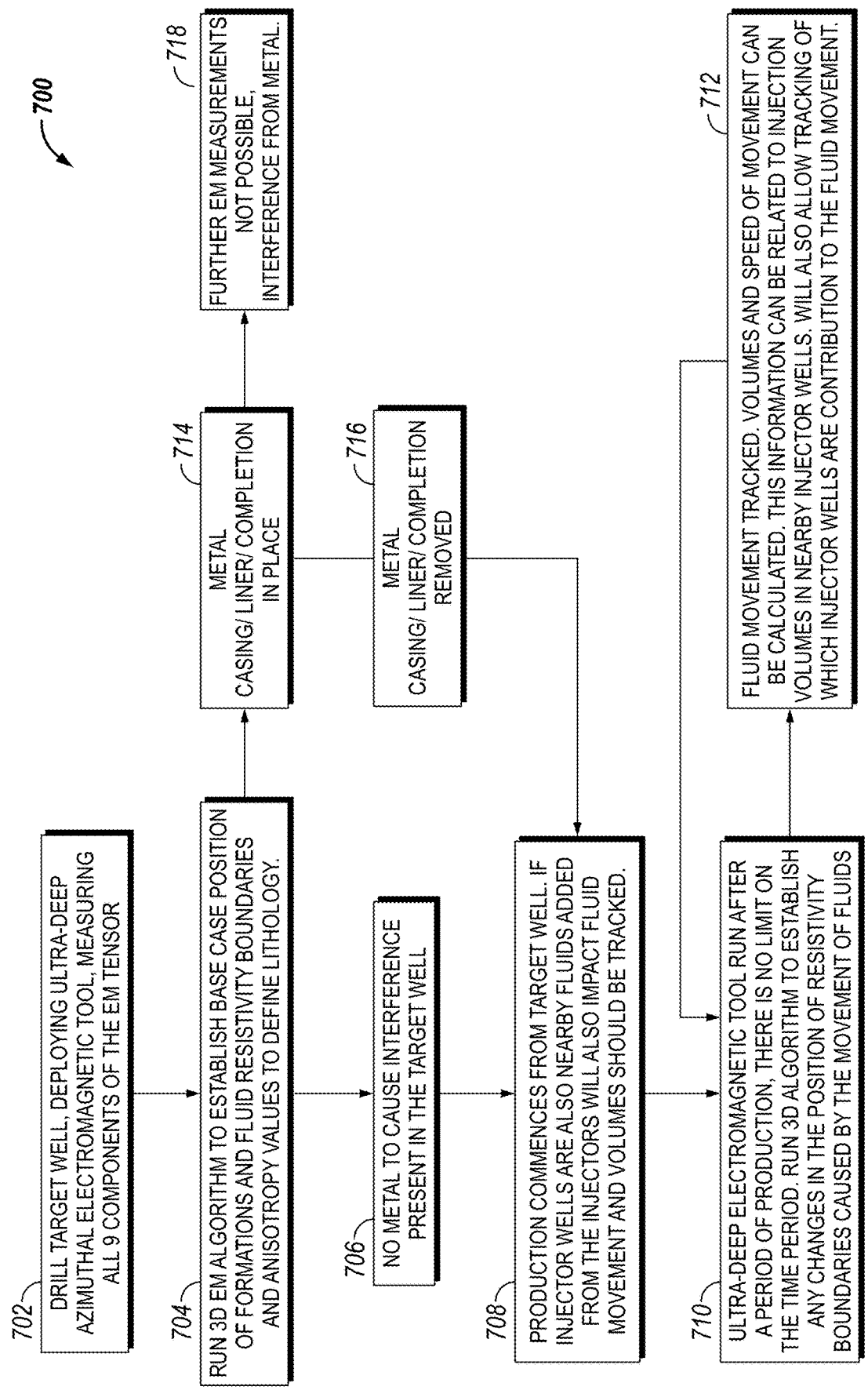
FIG. 7 illustrates a workflow for tracking formation fluid movement in a subterranean formation.

FIG. 7 illustrates a workflow 700 for tracking formation fluid movement in a subterranean formation 104 (e.g., referring to FIG. 1). As illustrated, workflow 700 may begin with block 702, in which a drilling operation is performed to form wellbore 101 using bottom hole assembly 128 in which a drill bit 118 may be attached (e.g., referring to FIG. 1). The drilling operation may form a vertical and/or horizontal wellbore 101. Disposed on bottom hole assembly may be EM measurement system 133 (e.g., referring to FIG. 1), which may take measurements during drilling operation to form an EM data set. In other examples, after drilling operations have concluded, bottom hole assembly 128 and drill bit 118 may be removed and a separate logging tool, which is EM measurement system 133, may be disposed in wellbore 101 for measurement operations to form an EM data set.

The EM data set may comprise of a plurality of measurements. These measurements maybe acquired utilizing one or more transmitters 134 and one on more receivers 136 disposed on one or more downhole tools of EM measurement system 133 (e.g., referring to FIG. 1). For example, during measurement operations, one or more transmitters 134 may transmit an electromagnetic (EM) field into subterranean formation 104. The EM filed may be altered by formation fluids and/or metals disposed within subterranean formation 104. The altered EM field may be measured by one or more receivers 136 disposed on the one or more downhole tools of EM measurement system 133. Each measurement may comprise all nine components of an EM Tensor, which may represent the electromagnetic field in a 3D space. An inversion may be performed on the nine components of the measured EM tensor to represent resistivity changes around wellbore 101 (e.g., referring to FIG. 1). The EM data set may comprise of EM measurements taken of subterranean formation 104 and/or formation fluids disposed within subterranean formation 104. After drilling and/or measurement operations, EM measurement system 133 is removed from wellbore 101 and production operations may be performed within wellbore 101.

In block 704, a three-dimensional (3D) inversion of the azimuthal EM data set is performed to form a first image of subterranean formation 104. In examples, the 3D inversion uses a Gauss Newton Gradient descent approach to fit modelled data to measurement taken by EM measurement system 133. This measurement operation may be performed in a wiper run or during drilling operations. A wiper run is performed with drill string 112, to clear wellbore 101. In examples, drill string 112 may be rotated while being moved into or out of wellbore 101, however wellbore 101 is not extended into subterranean formation 104, during the wiper run. This allows boundaries of subterranean formation 104 and formation fluid boundaries to be mapped in all directions around wellbore 101, based at least in part on the measurements taken by EM measurement system 133. Additionally, the first image of subterranean formation 104 may establish lithology for a base case position of subterranean formations 104, formation fluid resistivity boundaries, and anisotropy values. For example, both subterranean formation 104 (e.g., referring to FIG. 1) and formation fluids affect resistivity. If the formation fluid in subterranean formation 104 changes, such as from hydrocarbon to water, the overall resistivity changes. The resistivity values may be used in processing operations to identify the formation fluid content. Further still, anisotropy values may either be measured in measurement operations discussed above or inverted for.

In block 706, the first image is reviewed to determine if metal is present in the EM data set. Metal may cause interference, which may distort the first image, making the first image unreliable. Metal may be found in a casing, liner, tubing, or other elongated steel tubular disposed in wellbore 101. In examples, metal is identified in the first image as, generally, the position of metal in downhole objects may be known from previous operations. In addition, metal may have an effect on EM data, as the metal may cause distinctive signals that are seen in measurement operations. These signals may be used to identify the position of the metal.

Utilizing the first image, production operations may be performed on wellbore 101 in block 708. During production operations, formation fluid, such as water and/or hydrocarbons, may migrate within subterranean formation 104 (e.g., referring to FIG. 1) as formation fluid is removed from wellbore 101. Additionally, in production operations in which injector wells may be utilized, injected formation fluids and/or steam may further cause migration of formation fluids. During production operations in which injector wells may be utilized, it may be beneficial to track the volume of formation fluids being injected into subterranean formation 104. Likewise, it may be beneficial to track to not only the migration of formation fluids but the volume of formation fluids during migration. This may allow for personnel to determine what, if any, alterations to production operations should be performed.

After a duration of time, during or after production operations in block 708, EM measurement system 133 may be disposed into wellbore 101 for a second measurement operation in block 710. Without limitation, a duration of time between measurement operations may range from several days, a few months, every six months, and/or every year. The duration of time may also depend on how quickly formation fluid movement within subterranean formation 104 is determined to be from measurement operations. The second measurement operation may produce a second EM data set of EM measurements taken of subterranean formation 104 and/or formation fluids disposed within subterranean formation 104. In block 710, a second three-dimensional (3D) inversion may be performed using the second EM data set to form a second image of subterranean formation 104. This may allow boundaries of subterranean formation 104 and formation fluid boundaries to be mapped in all directions around wellbore 101, based at least in part on measurements from EM measurement system 133 in the second measurement operation.

In block 712, the first image of subterranean formation 104 and the second image of subterranean formation 104 are compared to each other to determine movement of formation fluids in subterranean formation 104, between measurement operations. Blocks 710 and 712 may be repeated any number of times. Additional measurement operations performed using EM measurement system 133 in wellbore 101 to form images with a 3D inversion may be compared to all previously formed images to determine movement of formation fluids in subterranean formation 104.

Referring back to block 704, in examples reviewing the first image may show that metal is present in the EM data set, as shown in block 714. Metal may cause interference, which may distort the first image, making the first image unreliable. Metal may be found in a casing, liner, tubing, or other elongated steel tubular disposed in wellbore 101. Additionally, previous knowledge of the construction of wellbore 101 (e.g., referring to FIG. 1) may notify personnel of metal within wellbore 101. If metal is found and/or known, performing measurement operations with EM measurement system 133 may not be possible and measurement operations may stop in block 718. However, in some operations, the metal may be removed from wellbore 101 in block 716. In such examples, after removal of metal in block 716, EM measurement system 133 may perform measurement operations in block 704. Workflow 700 may then continue as described above.

The improvement over the existing use of current technology is that current technology deploys ultra-deep azimuthal electromagnetic tools only during drilling operations, they are not run after a well has been completed. This is because, ultra-deep azimuthal electromagnetic tools are utilized only to identify the position of a wellbore within a subterranean formation so that adjustments may be made to the well path during drilling operations. Running ultra-deep azimuthal electromagnetic tools at intervals in wiper runs while rotating the bottom hole assembly after production has started may allow for the first time the movement of formation fluids to be mapped accurately around the well bore as time-based data will show the changes in the position of formation fluids over time and how quickly they are moving towards a wellbore. This application of the technology may allow the identification of any zones/areas/geological features that are increasing or limiting the flow of the formation fluids towards the reservoir and allow strategies to be employed to mitigate their effect on drawing water towards and into the wellbore. Additionally, while 4D seismic may be used on a larger scale to identify formation fluid movement over time, 4D seismic lacks the detail of mapping the formation fluid movement that an ultra-deep azimuthal electromagnetic tool may provide. The difference in scale is critical for identifying smaller geological features caused by lithological changes or sub seismic structural elements which may have an impact on formation fluid flow. The systems and methods may include any of the various features disclosed herein, including one or more of the following statements.

Statement 1: A method for monitoring one or more formation fluids in a subterranean formation. The method may comprise disposing a bottom hole assembly into a wellbore, measuring the one or more formation fluids in the subterranean formation with an electromagnetic (EM) measurement system disposed on the bottom hole assembly to form a first EM data set, removing the EM measurement system from the wellbore, and inverting the first EM data set using an information handling system to form a first image of the one or more formation fluids in the subterranean formation. The method may further comprise disposing the bottom hole assembly into the wellbore a second time, taking a second measurement of the one or more formation fluids in the subterranean formation to form a second EM data set, inverting the second EM data set using the information handling system to form a second image of the one or more formation fluids in the subterranean formation, and comparing the first image to the second image to identify movement of the one or more formation fluids in the subterranean formation.

Statement 2: The method of statement 1, further comprising determining if a metal is disposed in the wellbore by reviewing the first image.

Statement 3: The method of statement 2, wherein the metal is disposed in a casing, a liner, or a tubular.

Statement 4: The method of statement 2, further comprising removing the metal from the wellbore.

Statement 5: The method of statement 4, further comprising measuring the one or more formation fluids in the subterranean formation again after the metal has been removed from the wellbore.

Statement 6: The method of statements 1 or 2, wherein the bottom hole assembly is connected to a drill string.

Statement 7: The method of any preceding statements 1, 2, or 6, wherein the bottom hole assembly is disposed into the wellbore the second time is for a wiper run.

Statement 8: The method of any preceding statements 1, 2, 6, or 7, wherein the EM measurement system is an ultra-deep azimuthal electromagnetic tool.

Statement 9: The method of statement 8, wherein the ultra-deep azimuthal electromagnetic tool comprises two or more downhole tools.

Statement 10: The method of statement 9, wherein the two or more downhole tools each comprise a transmitter and a receiver.

Statement 11: A system for monitoring one or more formation fluids in a subterranean formation. The system may comprise an electromagnetic (EM) measurement system disposed on a bottom hole assembly. The EM measurement system may comprise one or more tools connected together on the bottom hole assembly or a drill string, one or more transmitters disposed on the one or more tools, and one or more receivers disposed on the one or more tools to take a first set of measurements of an EM field transmitted by the one or more transmitters at a first time, wherein the EM field is altered by one or more formation fluids in a subterranean formation. The system may further comprise an information handling system configured to form a first EM data set from the first set of measurements, invert the first EM data set to form a first image of the one or more formation fluids in the subterranean formation, form a second EM data set from a second set or measurements taken by the EM measurement system at a second time, invert the second EM data set to form a second image of the one or more formation fluids in the subterranean formation, and compare the first image to the second image to identify movement of the one or more formation fluids in the subterranean formation.

Statement 12: The system of statement 11, wherein the information handling system is further configured to show if a metal is disposed in a wellbore of the subterranean formation by reviewing the first image or the second image.

Statement 13: The system of statement 12, wherein the metal is disposed in a casing, a liner, or a tubular.

Statement 14: The system of statement 13, wherein the information handling system is further configured to form a third image from a third set of measurements taken by the EM measurement system after the metal has been removed from the wellbore.

Statement 15: The system of statements 11 or 12, wherein the bottom hole assembly is connected to the drill string.

Statement 16: The system of any preceding statements 11, 12, or 15, wherein the first set of measurements or second set of measurements are taken during a wiper run.

Statement 17: The system of any preceding statements 11, 12, 15, or 16, wherein the EM measurement system is an ultra-deep azimuthal electromagnetic tool.

Statement 18: The system of any preceding statements 11, 12, or 15-17, wherein the first set of measurements range to about one hundred feet from the EM measurement system.

Statement 19: The system of any preceding statements 11, 12, or 15-18, wherein the second set of measurements range to about one hundred feet from the EM measurement system.

Statement 20: The system of any preceding statements 11, 12, or 15-19, wherein the one or more formation fluids are water or hydrocarbons.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any comprised range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for monitoring one or more formation fluids in a subterranean formation comprising:
    disposing a bottom hole assembly into a wellbore;
    measuring the one or more formation fluids in the subterranean formation with an electromagnetic (EM) measurement system disposed on the bottom hole assembly to form a first EM data set;
    removing the EM measurement system from the wellbore;
    inverting the first EM data set using an information handling system to form a first image of the one or more formation fluids in the subterranean formation;
    disposing the bottom hole assembly into the wellbore a second time;
    taking a second measurement of the one or more formation fluids in the subterranean formation to form a second EM data set;
    inverting the second EM data set using the information handling system to form a second image of the one or more formation fluids in the subterranean formation; and
    comparing the first image to the second image to identify movement of the one or more formation fluids in the subterranean formation; and
    determining if a metal is disposed in the wellbore by reviewing the first image.

2. The method of claim 1, wherein the metal is disposed in a casing, a liner, or a tubular.

3. The method of claim 1, further comprising removing the metal from the wellbore.

4. The method of claim 3, further comprising measuring the one or more formation fluids in the subterranean formation again after the metal has been removed from the wellbore.

5. The method of claim 1, wherein the bottom hole assembly is connected to a drill string.

6. The method of claim 1, wherein the bottom hole assembly is disposed into the wellbore the second time is for a wiper run.

7. The method of claim 1, wherein the EM measurement system is an ultra-deep azimuthal electromagnetic tool.

8. The method of claim 7, wherein the ultra-deep azimuthal electromagnetic tool comprises two or more downhole tools.

9. The method of claim 8, wherein the two or more downhole tools each comprise a transmitter and a receiver.

10. A system for monitoring one or more formation fluids in a subterranean formation comprising:
    an electromagnetic (EM) measurement system disposed on a bottom hole assembly, wherein the EM measurement system comprises:
        one or more tools connected together on the bottom hole assembly or a drill string;

one or more transmitters disposed on the one or more tools; and one or more receivers disposed on the one or more tools to take a first set of measurements of an EM field transmitted by the one or more transmitters at a first time, wherein the EM field is altered by one or more formation fluids in a subterranean formation; and an information handling system configured to:

form a first EM data set from the first set of measurements;

invert the first EM data set to form a first image of the one or more formation fluids in the subterranean formation;

form a second EM data set from a second set or measurements taken by the EM measurement system at a second time;

invert the second EM data set to form a second image of the one or more formation fluids in the subterranean formation; and compare the first image to the second image to identify movement of the one or more formation fluids in the subterranean formation;

wherein the information handling system is further configured to show if a metal is disposed in a wellbore of the subterranean formation by reviewing the first image or the second image.

11. The system of claim 10, wherein the metal is disposed in a casing, a liner, or a tubular.

12. The system of claim 11, wherein the information handling system is further configured to form a third image from a third set of measurements taken by the EM measurement system after the metal has been removed from the wellbore.

13. The system of claim 10, wherein the bottom hole assembly is connected to the drill string.

14. The system of claim 10, wherein the first set of measurements or second set of measurements are taken during a wiper run.

15. The system of claim 10, wherein the EM measurement system is an ultra-deep azimuthal electromagnetic tool.

16. The system of claim 10, wherein the first set of measurements range to about one hundred feet from the EM measurement system.

17. The system of claim 10, wherein the second set of measurements range to about one hundred feet from the EM measurement system.

18. The system of claim 10, wherein the one or more formation fluids are water or hydrocarbons.

* * * * *